United States Patent
Arasaratnam et al.

(10) Patent No.: US 9,053,344 B2
(45) Date of Patent: *Jun. 9, 2015

(54) SECURING SENSITIVE DATA FOR CLOUD COMPUTING

(71) Applicant: International Business Machines Corporation, Armonk, NY (US)

(72) Inventors: Omkharan Arasaratnam, Ajax (CA); Garreth J. Jeremiah, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,024

(22) Filed: Aug. 5, 2013

(65) Prior Publication Data

US 2013/0312109 A1    Nov. 21, 2013

Related U.S. Application Data (63) Continuation of application No. 12/883,248, filed on Sep. 16, 2010, now Pat. No. 8,539,597.

(51) Int. Cl.
*G06F 7/04* (2006.01)
*G06F 21/62* (2013.01)
(Continued)

(52) U.S. Cl.
CPC .......... *G06F 21/6227* (2013.01); *G06F 21/602* (2013.01); *G06F 21/6218* (2013.01); *H04L 63/0428* (2013.01); *H04L 63/06* (2013.01); *H04L 2209/46* (2013.01); *G06F 2221/2111* (2013.01); *G06F 2221/2107* (2013.01)

(58) Field of Classification Search
CPC .............. G06F 21/602; G06F 21/6218; G06F 21/6227; H04L 63/06; H04L 63/0428

USPC ............. 726/14, 26, 2, 27, 30; 380/255; 713/150, 160, 161, 167, 189, 193

See application file for complete search history.

(56) References Cited

U.S. PATENT DOCUMENTS

| | | | |
|---|---|---|---|
| 6,078,907 A | 6/2000 | Lamm | |
| 6,446,145 B1 * | 9/2002 | Har et al. | 710/68 |
| 6,957,341 B2 | 10/2005 | Rice et al. | |

(Continued)

OTHER PUBLICATIONS

Notice of Allowance (Mail Date May 14, 2013) for U.S. Appl. No. 12/883,248, filed Sep. 16, 2010, First Named Inventor Omkharan Arasaratnam, Confirmation No. 4480.

(Continued)

*Primary Examiner* — Phuoc Nguyen
*Assistant Examiner* — Davoud Zand
(74) *Attorney, Agent, or Firm* — Schmeiser, Olsen & Watts, LLP; John Pivnichny (57) ABSTRACT

A method and associated system for securing sensitive data in a cloud computing environment. A system has proprietary data as a record stored in a database. The system associates a hashing directive with the record prior to sending the data out to a cloud for computing services. The hashing directive classifies each data field of the record into sensitive and transactional. The hashing directive controls a mode of hashing, either one-way hashing or two-way hashing for each sensitive data field associated with the hashing directive. A cloud receives the record secured according to the hashing directive and process the record to generate a result value for a cloud process result field of the record. The system reconstitutes the record the record according to the mode of hashing indicated in the hashing directive.

13 Claims, 6 Drawing Sheets

(51) Int. Cl.
*G06F 21/60* (2013.01)
*H04L 29/06* (2006.01)

(56) References Cited

U.S. PATENT DOCUMENTS

| | | | |
|---|---|---|---|
| 8,176,563 B2* | 5/2012 | Redlich et al. | 726/27 |
| 2002/0024830 A1* | 2/2002 | Yoneda | 365/49 |
| 2002/0073138 A1 | 6/2002 | Gilbert et al. | |
| 2005/0010685 A1* | 1/2005 | Ramnath et al. | 709/238 |
| 2006/0224589 A1 | 10/2006 | Rowney et al. | |
| 2008/0066185 A1 | 3/2008 | Lester et al. | |
| 2008/0181396 A1 | 7/2008 | Balakrishnan et al. | |
| 2009/0046848 A1 | 2/2009 | Booth | |
| 2009/0132419 A1 | 5/2009 | Grammer et al. | |
| 2010/0162367 A1* | 6/2010 | LaJoie et al. | 726/4 |
| 2010/0281030 A1* | 11/2010 | Kusumura et al. | 707/741 |
| 2011/0093457 A1* | 4/2011 | Kobayashi | 707/723 |
| 2011/0302630 A1* | 12/2011 | Nair et al. | 726/4 |

OTHER PUBLICATIONS

Response to Final Office Action (Filed Apr. 30, 2013) for U.S. Appl. No. 12/883,248, filed Sep. 16, 2010, First Named Inventor Omkharan Arasaratnam, Confirmation No. 4480.

Office Action (Mail Date Mar. 1, 2013) for U.S. Appl. No. 12/883,248, filed Sep. 16, 2010, First Named Inventor Omkharan Arasaratnam, Confirmation No. 4480.

Response to Office Action (Filed Feb. 19, 2013) for U.S. Appl. No. 12/883,248, filed Sep. 16, 2010, First Named Inventor Omkharan Arasaratnam, Confirmation No. 4480.

Office Action (Mail Date Nov. 16, 2012) for U.S. Appl. No. 12/883,248, filed Sep. 16, 2010, First Named Inventor Omkharan Arasaratnam, Confirmation No. 4480.

* cited by examiner

SECURING SENSITIVE DATA FOR CLOUD COMPUTING

This application is a continuation application claiming priority to Ser. No. 12/883,248 filed Sep. 16, 2010, now U.S. Pat. No. 8,539,597, issued Sep. 17, 2013.

BACKGROUND OF THE INVENTION

Aspects of the present invention disclose a system and associated method for securing data for cloud computing. In a conventional cloud computing environment, proprietary data may be exposed to an unauthorized access because multiple customers share a computing infrastructure for a low cost of processing their respective proprietary data in the cloud computing environment. Although cloud computing is desirable for more cost-effective computing of massive data to customers and high level of resource utilization of existing computing infrastructures for providers, data security is one of major blocking factor when sensitive data needs to be processed in cloud computing environment. With conventional data security measures in cloud computing, a separate securing process for sensitive data is required.

BRIEF SUMMARY

According to one embodiment of the present invention, a method for securing sensitive data in a cloud computing environment comprises associating, by a customer system, a hashing directive with a record of the customer system, wherein the cloud computing environment comprises a cloud and the customer system, wherein the customer system comprises a database storing the record, and wherein the record comprises at least one data field; obfuscating the record by hashing a respective value of each data field of said at least one data field pursuant to the associated hashing directive, wherein the hashing directive comprises a respective tag classifying said each data field as either a sensitive data field or a transactional data field, and a respective mode of hashing for each sensitive data field of the record; sending the obfuscated record to the cloud, wherein the cloud is configured to process the obfuscated record and to instantiate a cloud process result field of the record with a result value calculated with values of transactional data fields of the record; receiving the processed record having the instantiated result value from the cloud; and reconstituting the record by respectively reversing said obfuscating for said each sensitive data field of the record pursuant to the respective mode of hashing for each sensitive data field in the hashing directive.

According to one embodiment of the present invention, a computer program product comprises a computer readable memory unit that embodies a computer readable program code. The computer readable program code contains instructions that, when run by a processor of a computer system, implement a method for securing sensitive data in a cloud computing environment.

According to one embodiment of the present invention, a computer system comprises a processor and a computer readable memory unit coupled to the processor, wherein the computer readable memory unit containing instructions that, when run by the processor, implement a method for securing sensitive data in a cloud computing environment.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for securing sensitive data in a cloud computing environment.

DETAILED DESCRIPTION

Figure 1:
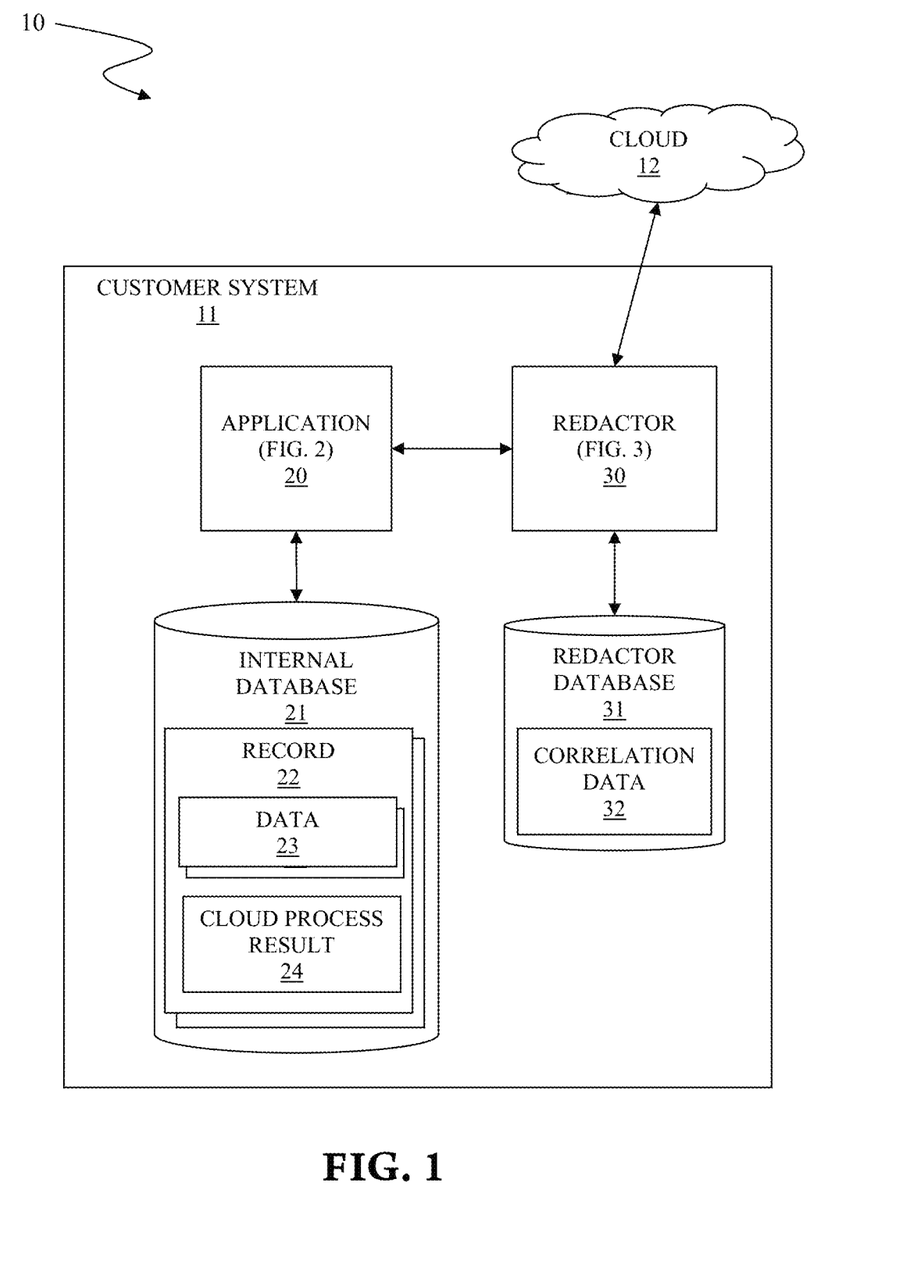
FIG. 1 illustrates a system for securing sensitive data in a cloud computing environment, in accordance with embodiments of the present invention.

FIG. 1 illustrates a system 10 for securing sensitive data in a cloud computing environment, in accordance with embodiments of the present invention.

The system 10 comprises a customer system 11 and a cloud 12. The customer system 11 is a computing system internal to a customer organization for processing at least one record of the customer organization. The customer system 11 ensures data security of said at least one record within the customer system 11. The customer organization subscribes to the cloud 12 for a cloud computing service. In general, the term "sensitive data" indicates personal, financial, and/or legal information that should be considered for data security, regardless of public availability of the information. In this specification, the term "sensitive data" is defined as data that should not be directly exposed outside of the customer system 11.

The cloud 12 provides the cloud computing service to the customer organization for a fee. The cloud 12 comprises a group of interconnected computing infrastructure/resources coupled to the customer system 11 over the Internet. The cloud 12 is commonly a computing system of a third-party service provider. Examples of the cloud computing service may be, inter alia, credit card validation service for a commercial transaction, data center service, high performance computation service, etc. Examples of the cloud 12 may be, inter alia, SAVVIS$^{SM}$, Google™, Microsoft®, Amazon.com®, etc. (SAVVIS is a service mark of Savvis Inc., in the United States and/or other countries; Google is a trademark of Google Inc., in the United States and/or other countries; Microsoft is a registered trademark of Microsoft Corporation in the United States and/or other countries; and Amazon.com is a registered trademark of Amazon.com Inc., in the United States and/or other countries)

The customer system 11 comprises an application 20, an internal database 21, a redactor 30 and a redactor database 31.

The application 20 is a computer program that processes a record 22 of said at least one record stored in the internal database 21 by use of the redactor 30 to secure sensitive data of the record 22. The application 20 updates the internal database 21 once the record 22 is returned from the redactor 30. See descriptions of FIG. 2, infra, for detailed operations of the application 20.

In one embodiment of the present invention, the application 20 comprises a cache for storing the record 22 that is being sent to the redactor 30 for faster and easier access to the record 22.

The internal database 21 is a proprietary database of the customer organization, which stores said at least one record of the customer organization. The record 22 of said at least one record comprises at least one data field and a cloud process result field 24. The record 22 is a unit for processing by the customer system 11 and the cloud 12, which represents a set of meaningful information by respective fields. A data field 23 of said at least one data field may be sensitive or transactional, based on data security/sensitivity criteria of the customer system 11. Values of sensitive data fields are sensitive data as defined in this specification supra. Values of transactional data fields are to be sent to the cloud 12 to process the record 22. In this specification, transactional data fields are inherently non-sensitive, because values of the transactional data field must be exported to the cloud 23. The cloud 12 calculates a result value of processing based on values of transactional data fields of the record 22 and updates the cloud process result field 24 with the result value.

In one embodiment of the present invention, the record 22 represents an applicant record that describes personal and financial profile of a user who applies for a new credit. The cloud 12 provides a credit approval service that determines whether the new credit application can be approved for the user upon processing the record 22. The applicant record comprises sensitive data that needs to be redacted prior to export the record 22 to the cloud 12 for approval process and transactional data that should be exported and be processed by the cloud 12 for the approval process. In this embodiment, sensitive data of the record 22 may be, inter alia, name, address, city, state/province, country, etc., and transactional data of the record 22 may be, inter alia, Social Security Number/Tax ID, yearly income, etc. The cloud process result field 24 represents a credit approval value of Boolean type, wherein a value TRUE indicates that the cloud 12 approves the user for the new credit, and wherein a value FALSE indicates that the cloud 12 disapproves the user for the new credit.

The redactor 30 receives the record 22 from the application 20 and automatically redacts each sensitive data from the record 22 by hashing. In one embodiment of the present invention, the redactor 30 utilizes metadata information of the record 22 in hashing each field of sensitive data in the record 22. The metadata information of each field of the record 22 may be, inter alia, data type, field value range constraints, checksum comparison, etc., such as alphanumeric string with length limitation, integer, real number, Luhn check value, etc. Correlation data 32 for each sensitive data field in the record 22 comprises the metadata information used in securing the sensitive data and a respective original data value of each sensitive data field of the record 22. The redactor 30 stores the correlation data 32 in the redactor database 31 and sends the redacted record to the cloud 12 for processing. The cloud 12 processes the redacted record based on the original data values of each transactional data field of the record 22, since sensitive data is not transactional for the computing service performed by the cloud 12.

The redactor 30 receives the redacted record having the cloud process result field 24 instantiated by the cloud 12, after the cloud 12 completes processing the redacted record. The redactor 30 retrieves the correlation data 32 from the redactor database 31 and reconstitutes the record 22 by reinstating the respective original data value of each sensitive data field in the record 22 by reverse-hashing. The redactor 30 finally returns the record 22 having original data values and the instantiated cloud process result field 24 to the application 20.

Figure 2:
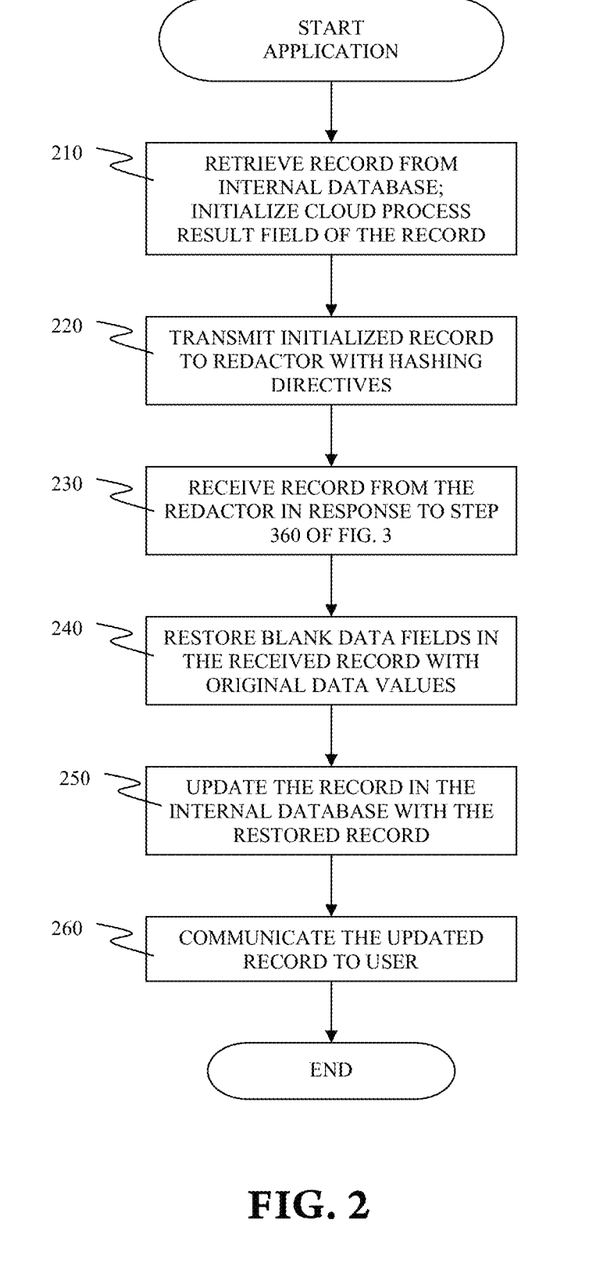
FIG. 2 is a flowchart depicting a method for securing sensitive data in a cloud computing environment as performed by the application of FIG. 1, in accordance with the embodiments of the present invention.

FIG. 2 is a flowchart depicting a method for securing sensitive data in a cloud computing environment as performed by the application of FIG. 1, supra, in accordance with the embodiments of the present invention.

In step 210, the application retrieves a record to process from the internal database. The record comprises at least one sensitive data field and at least one transactional data field. The application initializes the cloud process result field of the record. See FIG. 5, infra, for an example. The application proceeds with step 220.

In step 220, the application transmits the record retrieved and initialized in step 210 and hashing directives to the redactor. The hashing directives comprise information for the redactor as to which data field is sensitive and which data field is transactional for the cloud computing, and a respective mode of hashing for each sensitive data field. See FIG. 5, infra, for an example of the record.

In one embodiment of the present invention, a respective hashing directive is associated with each data field of the record. In the same embodiment of the present invention, the respective mode of hashing for each sensitive data field is selected from {one-way hashing, two-way hashing }. With one-way hashing, the application directs the redactor to simply remove the data value of the sensitive data field. With two-way hashing, the application directs the redactor to hash the data value of the sensitive data field for cloud processing and to restore the value after the record is returned from the cloud. The application is configured to determine the hashing mode for each sensitive data field based on the needs and requirements of the data security and processing efficiency and/or user inputs. See descriptions of FIG. 4, infra, for an exemplary definition of data sensitivity and examples of sensitive data fields. The redactor starts step 310 in response to step 220 by the application. See descriptions of FIG. 3, infra, for operations performed by the redactor. The application proceeds with step 230.

Figure 3:
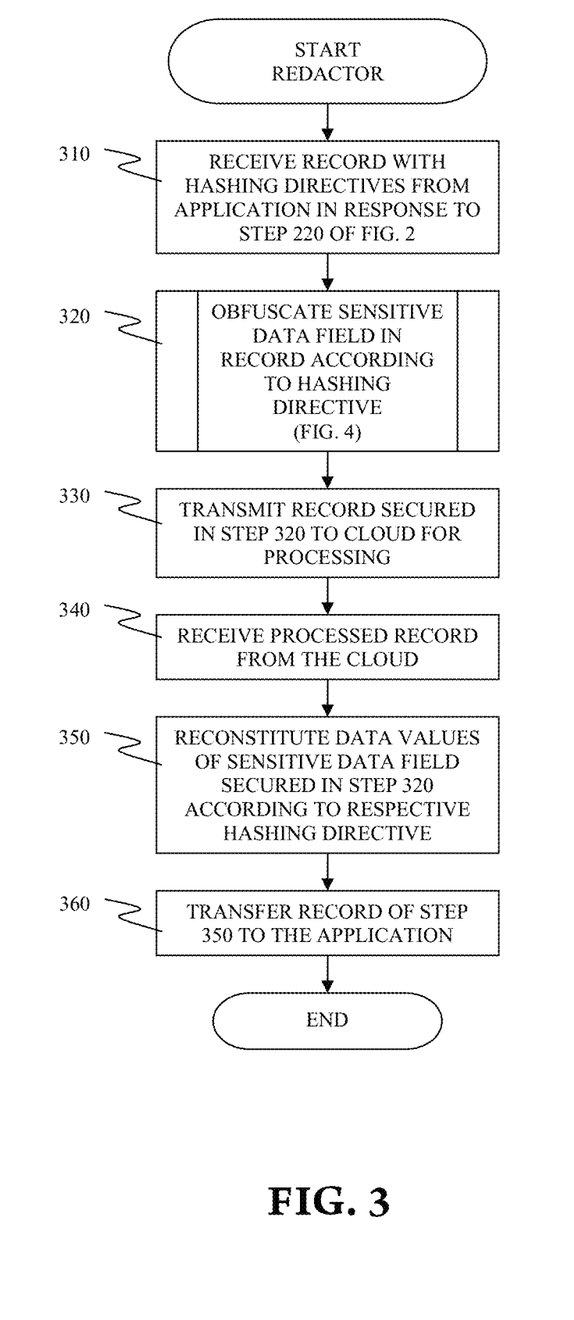
FIG. 3 is a flowchart depicting a method for securing sensitive data in a cloud computing environment as performed by the redactor of FIG. 1, in accordance with the embodiments of the present invention.

In step 230, the application receives the record from the redactor in response to step 360 of FIG. 3, infra, as the redactor sends the record to the application. The application subsequently processes the record by filling in blank fields of the record with the respective original data value of the record, when the redactor performed one-way hashing to secure sensitive data fields but did not reinstated the original data value once the redacted record is returned from the cloud. The application may keep the original data values within the application by caching the record or re-access the internal database for the original data values of the record. The application proceeds with step 240.

In step 240, the application updates the internal database with the record comprising all original data values for the at least one sensitive data field as being reinstated by the redactor or filled in by the application, and the at least one transactional data field, and a new value for the cloud process result field as instantiated by the cloud. In step 260, the application communicates the result to the user. See FIG. 5, infra, for an example. The application completes processing the record and terminates.

FIG. 3 is a flowchart depicting a method for securing sensitive data in a cloud computing environment as performed by the redactor of FIG. 1, supra, in accordance with the embodiments of the present invention.

In step 310, the redactor receives the record and the hashing directives from the application in response to step 220 of FIG. 2, supra. The redactor proceeds with step 320.

In step 320, the redactor obfuscate the record by hashing data values of all sensitive data fields in record according to a respective hashing directive for each sensitive data field. The redactor proceeds with step 330.

In one embodiment of the present invention, the respective hashing directive used in step 320 is selected from the group consisting of {one-way hashing, two-way hashing }. The hashing directive "one-way hashing" indicates that an original data value associated with the sensitive data field is removed but not restored by the redactor. The hashing directive "two-way hashing" indicates that the original data value associated with the sensitive data field is hashed and then reinstated back to the original value after the cloud processing by the redactor. See descriptions of FIG. 4, infra, for detailed operations of the same embodiment of step 320.

In step 330, the redactor transmits the record secured in step 320 to the cloud for processing. See FIG. 5, infra, for an example. The redactor proceeds with step 340.

In step 340, the redactor receives the record from the cloud. The record returned from the cloud comprises the cloud process result field instantiated by the cloud based on the transactional data values in the record sent by the redactor. See descriptions of FIG. 5, infra, for an example. The redactor proceeds with step 350.

In step 350, the redactor reconstitutes the record by reinstating the respective data values of the sensitive data fields obfuscated in step 320 according to each hashing directive associated with each sensitive data field. The redactor utilizes correlation data of each sensitive data field stored in the redactor database, wherein the hashing directive requires the respective original data value to be restored. See descriptions of FIG. 5, infra, for an example. The redactor proceeds with step 360.

In step 360, the redactor transfers the record of step 350 with reinstated original values according to each hashing directive back to the application. See descriptions of FIG. 5, infra, for an example. Then the redactor terminates processing the record.

Figure 4:
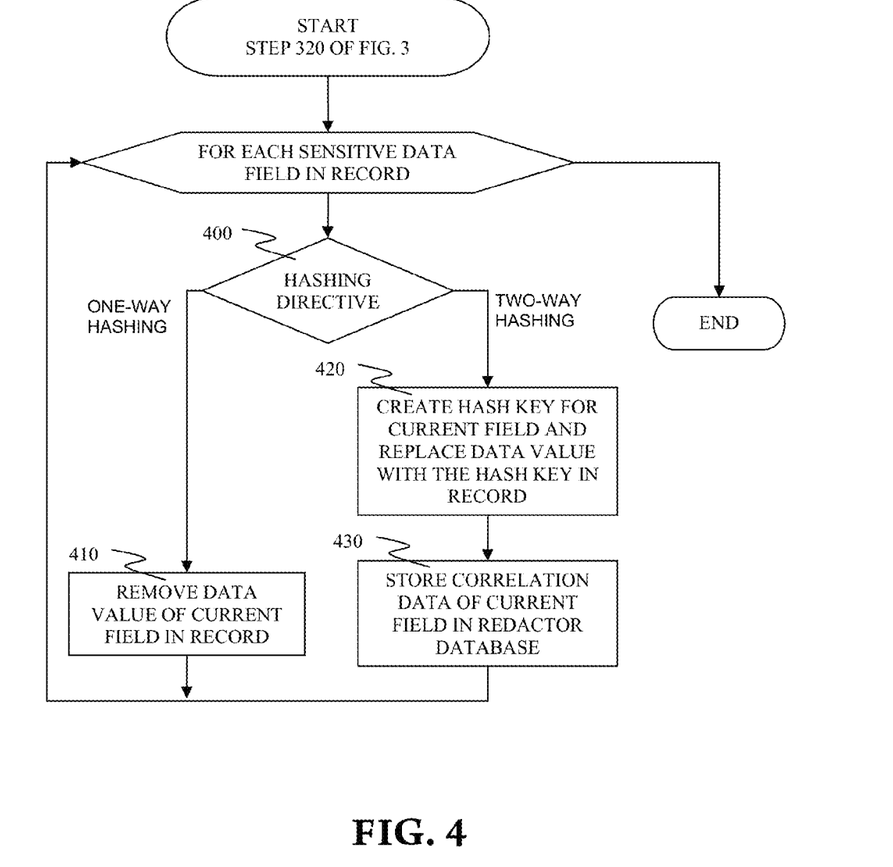
FIG. 4 is a flowchart depicting a method for securing each sensitive data field of a record according to a respective hashing directive, as performed by the redactor in step 320 of FIG. 3, in accordance with the embodiments of the present invention.

FIG. 4 is a flowchart depicting a method for securing each sensitive data field of a record according to a respective hashing directive, as performed by the redactor in step 320 of FIG. 3, supra, in accordance with the embodiments of the present invention.

In this embodiment, a value for the respective hashing directive is selected from the group consisting of {one-way hashing, two-way hashing }, as being sent by the application to redactor. The hashing directive "one-way hashing" indicates that an original data value associated with the sensitive data field is removed but not restored by the redactor. Data values of the sensitive data fields with hashing directives of "one-way hashing" are instantiated by the application either by restoring a respectively original data value cached by the application or by replacing the original data value with any other value as calculated by the application once the record is returned from the redactor. The hashing directive "two-way hashing" indicates that the original data value associated with the sensitive data field is hashed prior to the cloud processing and then reinstated, by the redactor, back to the original value after the cloud processing. See descriptions of FIG. 4, infra, for the same embodiment of step 320.

The redactor performs steps 400 through 430 for each sensitive data field in the record. The redactor selects a first sensitive data field as a current field and proceeds to step 400. Upon performing steps 400 through 430 for all sensitive data field in the record, the redactor completes step 320 and proceeds with step 330 of FIG. 3, supra.

In step 400, the redactor examines the value of the hashing directive for the current field. If the value of the hashing directive for the current field is "one-way hashing", then the redactor proceeds with step 410. If the value of the hashing directive for the current field is "two-way hashing", then the redactor proceeds with step 420.

In step 410, the redactor removes a data value of the current field to secure the record for cloud processing, as dictated by the hashing directive of "one-way hashing". The redactor loops back to step 400 with a next unsecured sensitive data field.

In step 420, the redactor creates a hash key for the current field and replaces the data value of the current field with the created hash key to secure the record for cloud processing, as dictated by the hashing directive of "two-way hashing". The redactor proceeds with step 430.

In step 430, the redactor stores a correlation data for the current field in the redactor database. The correlation data comprises metadata information used in hashing the data value of the current field and the data value of the current field. The correlation data enables reverse-hashing with the hash key created in step 420 to obtain the data value prior to hashing. See descriptions of FIG. 5, infra, for an example. The redactor loops back to step 400 with next unsecured sensitive data field.

Figure 5:
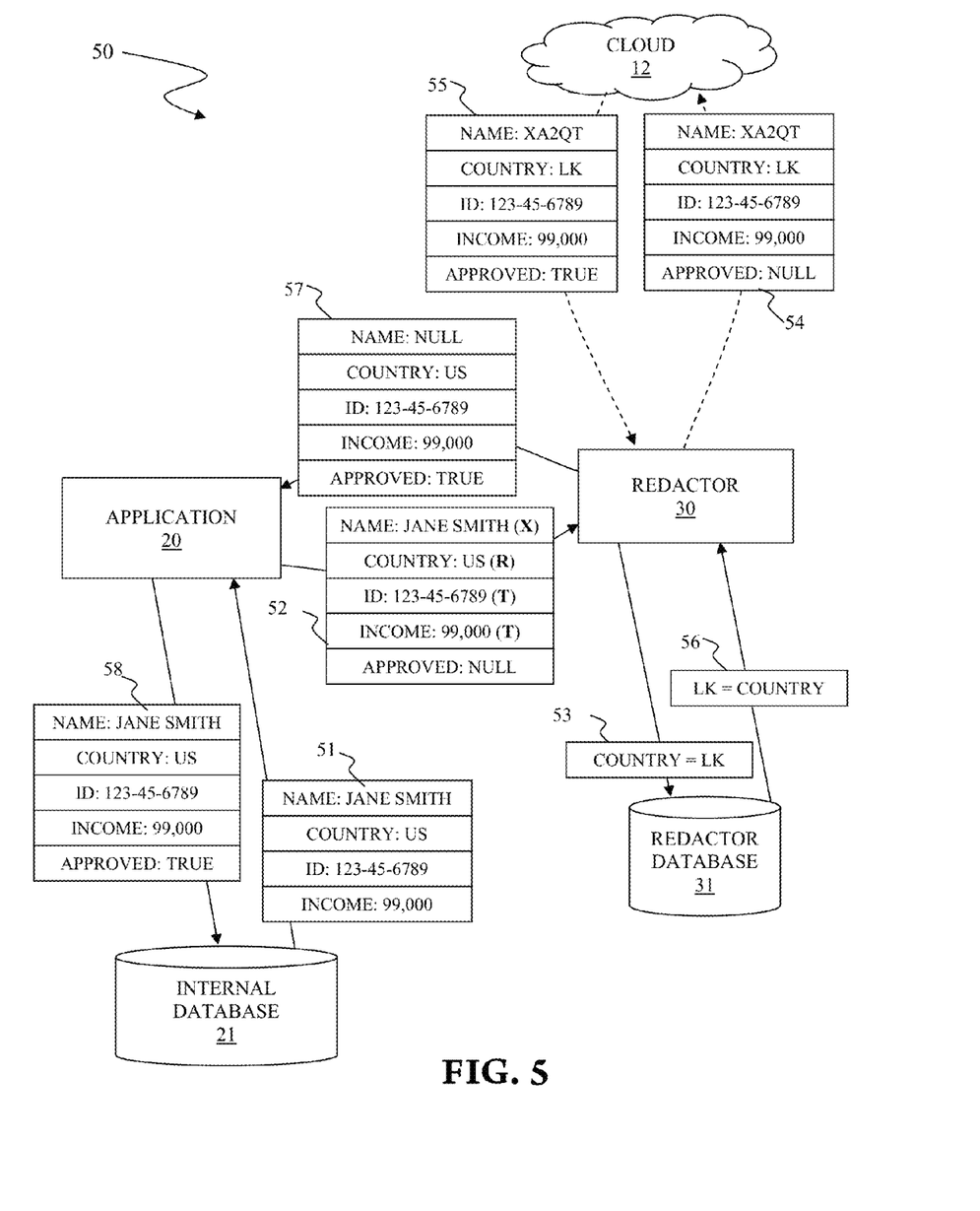
FIG. 5 illustrates an example of data flows among components of the system of FIG. 1, performing the method for securing sensitive data in a cloud computing environment, in accordance with the embodiments of the present invention.

FIG. 5 illustrates an example of data flows among components of the system of FIG. 1, supra, performing the method for securing sensitive data in a cloud computing environment, in accordance with the embodiments of the present invention.

In the same embodiment wherein the record represents an applicant record that describes personal and financial profile of an applicant who applies for a new credit and wherein the cloud provides a credit approval service to numerous customer organizations, data fields of the applicant record comprise NAME, COUNTRY, ID, and INCOME. In this example, NAME field has a first data value representing a name of the applicant; COUNTRY field has a second data value representing the country of the applicant; ID field has a third data value representing an identification number which is used to uniquely identify the applicant in financial transactions within the country of the applicant; and INCOME field has a fourth data value representing annual income of the applicant. NAME field and COUNTRY field are sensitive data fields that should be secured prior to cloud computing. SSN field and INCOME field are transactional data to be processed by the cloud.

Record 51 represents an instance of the record that the application 20 retrieves from the internal database 21 as in step 210 of FIG. 2, supra. NAME field has the first data value "JANE SMITH". COUNTRY field has the second data value "US". ID field has the third data value "123-45-6789". INCOME field has the fourth data value "99,000". The unit of data values in INCOME field is US Dollar, according to the "US" COUNTRY field.

Record 52 represents an instance of the record that the application 20 sends to the redactor as in step 220 of FIG. 2, supra. The application initializes a cloud process result field APPROVED of the record to NULL with a fifth data value representing whether or not the new credit application is approved by the cloud. The fifth data value for APPROVED field is selected from {true, false }, wherein "true" indicates that the new credit application is approved and "false" indicates that the new credit application is disapproved.

The application also attaches a respective hashing directive for each data field in the record. In this example, a hashing directive is selected from {X, R, T}, wherein "X" indicates that the data field is sensitive and that the data value of the data field needs to be redacted, that is one-way hashing, wherein "R" indicates that the data field is sensitive and that the data value of the data field needs to be redacted and then restored, that is two-way hashing, and wherein "T" indicates that the data value of the data field is transactional, that is, the data value should be exported to the cloud for processing and no data security measure needs to be applied. In the same embodiment, the record may further comprises additional sensitive data fields of ADDRESS, CITY, STATE/PROVINCE, which are associated with the hashing directive "X" for one-way hashing.

The redactor processes data fields of Record 52 according to the respective hashing directive as in step 320 of FIG. 3, supra. Both NAME and COUNTRY data fields are hashed by the redactor. Because only COUNTRY field has "R" hashing directive indicating two-way hashing, the redactor stores correlation data for COUNTRY field in the redactor database 31 as shown in Record 53. The correlation data for COUNTRY field comprise the field name "COUNTRY" that being hashed and a hashing value "LK".

Record 54 represents an instance of the record that the redactor 30 sends to the cloud 12 for a credit approval as in step 330 of FIG. 3, supra. NAME field has a first hashing value of "XA2QT" and COUNTRY field has a second hashing value "LK" as calculated by the redactor. The redactor forwards, from the application to the cloud, respective original data values for transactional data fields ID and INCOME as well as APPROVED field.

Record 55 represents an instance of the record that the redactor 30 receives from the cloud 12 after processing as in step 340 of FIG. 3, supra. The cloud 12 instantiated APPROVED field with "true", which indicates the cloud approves the new credit application of the applicant based on the data values of the transactional data fields ID and INCOME. The cloud only changes a data value of the cloud process result field APPROVED.

Record 56 represents the correlation data retrieved from the redactor database 31 by the redactor 30 as in step 350 of FIG. 3, supra. The redactor 30 reinstates the original data value "US" of COUNTRY field by use of the correlation data. The redactor 30 acquires the original data value "US" for COUNTRY field from the hashing value "LK" by reversing the hashing process.

Record 57 represents an instance of the record that the redactor returns to the application after restoring the record according to the hashing directives as in step 360 of FIG. 3, supra. The first sensitive data field "NAME" is not restored with the original data value because the hashing directive "X" requires one-way hashing. The second sensitive data field "COUNTRY" is restored with the original data value "US" by use of the hashing value "LK" as a key, because the hashing directive "R" requires two-way hashing. Data values of ID, INCOME, and APPROVED remain identical to the respective data values of Record 55 as received from the cloud.

Record 58 represents an instance of the record that the application updates the internal database as in step 240 of FIG. 2, supra. The first sensitive data field "NAME" is restored with the original data value "JANE SMITH" by the application. Data values of COUNTRY, ID, INCOME, and APPROVED remain identical to the respective data values of Record 57 as received from the redactor.

Figure 6:
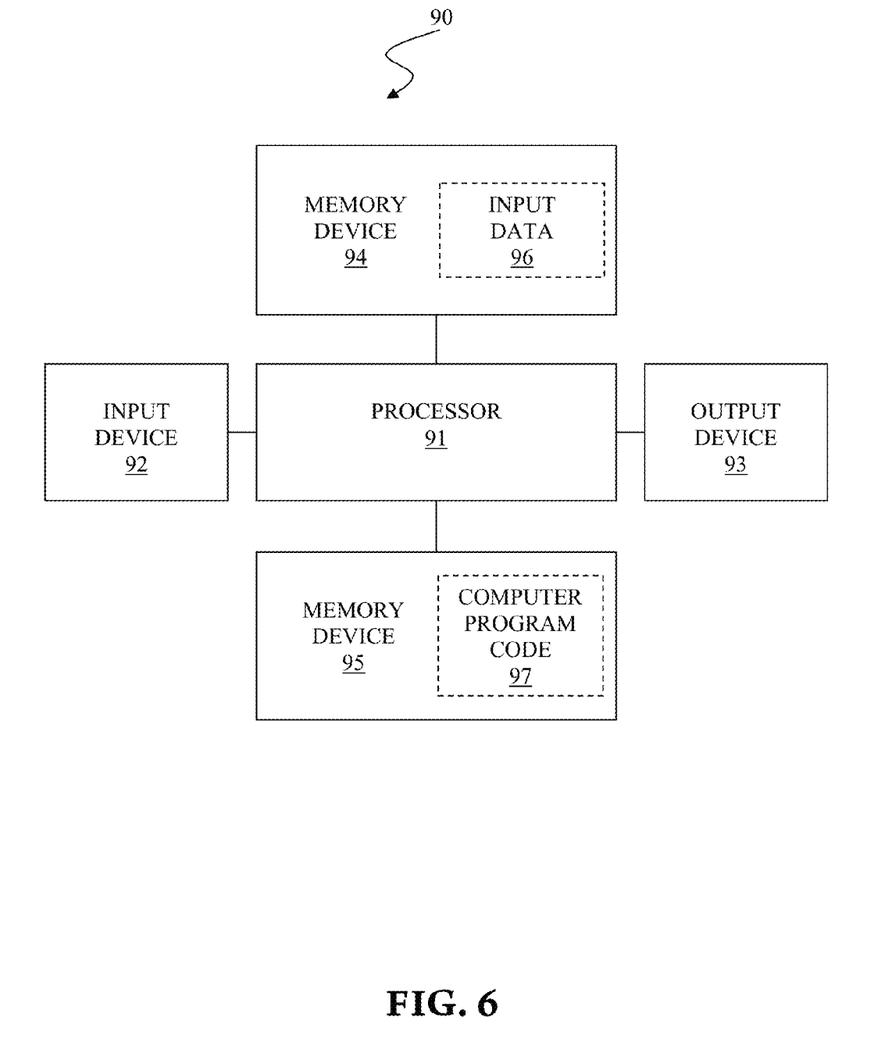
FIG. 6 illustrates a computer system 90 used for securing sensitive data in a cloud computing environment, in accordance with the embodiments of the present invention.

FIG. 6 illustrates a computer system 90 used for securing sensitive data in a cloud computing environment, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for securing sensitive data in the cloud computing environment of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for securing sensitive data in the cloud computing environment.

In another embodiment, the invention provides a method that performs the process steps of the invention on a subscription, advertising and/or fee basis. That is, a service provider, such as a Solution Integrator, can offer to create, maintain, support, etc., a process for securing sensitive data in the cloud computing environment of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for securing sensitive data in a cloud computing environment, said method comprising:

associating, by a processor of a computer system, a hashing directive with a record of a customer system, wherein the cloud computing environment comprises a cloud and the customer system, wherein the customer system is external to the cloud, wherein the customer system comprises the computer system, wherein the computer system comprises a database storing the record, and wherein the record comprises at least one data field;

said processor obfuscating the record by hashing a respective value of each data field of said at least one data field pursuant to the associated hashing directive, wherein the hashing directive comprises a respective tag classifying said each data field as either a sensitive data field or a transactional data field, and a respective mode of hashing for each sensitive data field of the record, and wherein said obfuscating comprises removing, from the record, a first value of a first data field of the record such that the first value is not available in the record;

said processor sending the obfuscated record to the cloud, wherein the cloud is configured to process the obfuscated record and to instantiate a cloud process result field of the record with a result value calculated with values of transactional data fields of the record;

said processor receiving the processed record having the instantiated result value from the cloud; and said processor reconstituting the record by respectively reversing said obfuscating for said each sensitive data field of the record pursuant to the respective mode of hashing for each sensitive data field in the hashing directive, wherein said reconstituting comprises:

retrieving the record from the database, wherein the retrieved record comprises respective values of said at least one data field prior to said obfuscating;

reinstating the first data field of the record received from the cloud with an original value in the first data field of the retrieved record, wherein the original value is identical to the first value prior to said obfuscating; and storing, in the database, the record from said reinstating such that the record comprises the respective value for said at least one data field and the result value of the cloud process result field.

2. The method of claim 1, said obfuscating comprising:
selecting a first data field of the record, wherein the hashing directive indicates that the first data field is sensitive by a first tag associated with the first data field; and
determining that a first mode associated with the first data field is one-way hashing.

3. The method of claim 1, said obfuscating comprising:
selecting a second data field of the record;
determining that a second mode associated with the second data field is two-way hashing;
creating a hash key corresponding to a second value of the second data field;
replacing the second value with the created hash key in the second data field; and
storing, in the database, correlation data corresponding to the second data field, the correlation data comprising metadata used in said creating the hash key and the second value.

4. The method of claim 3, said reconstituting comprising:
retrieving the correlation data from the database;
calculating the second value from the hash key and the metadata of the correlation data;
replacing the hash key in the record received from the cloud with the calculated second value in the second data field of the record; and
storing, in the database, the record from said replacing.

5. The method of claim 1, said method further comprising:
providing at least one support service for at least one of creating, integrating, hosting, maintaining, and deploying computer-readable program code in the computer system, said program code being executed by the processor to implement said associating, said obfuscating, said sending the obfuscated record to the cloud, said receiving the processed record, and said reconstituting the record.

6. A computer program product comprising a computer readable storage memory having a computer readable program code embodied therein, said computer readable program code containing instructions which upon being executed by a processor of a computer system performs a method for securing sensitive data in a cloud computing environment, said method comprising:

associating, by the processor of the computer system, a hashing directive with a record of a customer system, wherein the cloud computing environment comprises a cloud and the customer system, wherein the customer system is external to the cloud, wherein the customer system comprises the computer system, wherein the computer system comprises a database storing the record, and wherein the record comprises at least one data field;

said processor obfuscating the record by hashing a respective value of each data field of said at least one data field pursuant to the associated hashing directive, wherein the hashing directive comprises a respective tag classifying said each data field as either a sensitive data field or a transactional data field, and a respective mode of hashing for each sensitive data field of the record, and wherein said obfuscating comprises removing, from the record, a first value of a first data field of the record such that the first value is not available in the record;

said processor sending the obfuscated record to the cloud, wherein the cloud is configured to process the obfuscated record and to instantiate a cloud process result field of the record with a result value calculated with values of transactional data fields of the record;

said processor receiving the processed record having the instantiated result value from the cloud; and said processor reconstituting the record by respectively reversing said obfuscating for said each sensitive data field of the record pursuant to the respective mode of hashing for each sensitive data field in the hashing directive, wherein said reconstituting comprises:

retrieving the record from the database, wherein the retrieved record comprises respective values of said at least one data field prior to said obfuscating;

reinstating the first data field of the record received from the cloud with an original value in the first data field of the retrieved record, wherein the original value is identical to the first value prior to said obfuscating; and storing, in the database, the record from said reinstating such that the record comprises the respective value for said at least one data field and the result value of the cloud process result field.

7. The computer program product of claim 6, said obfuscating comprising:
selecting a first data field of the record, wherein the hashing directive indicates that the first data field is sensitive by a first tag associated with the first data field; and
determining that a first mode associated with the first data field is one-way hashing.

8. The computer program product of claim 6, said obfuscating comprising:
selecting a second data field of the record;
determining that a second mode associated with the second data field is two-way hashing;

creating a hash key corresponding to a second value of the second data field;

replacing the second value with the created hash key in the second data field; and storing, in the database, correlation data corresponding to the second data field, the correlation data comprising metadata used in said creating the hash key and the second value.

9. The computer program product of claim 8, said reconstituting comprising:

retrieving the correlation data from the database;

calculating the second value from the hash key and the metadata of the correlation data;

replacing the hash key in the record received from the cloud with the calculated second value in the second data field of the record; and storing, in the database, the record from said replacing.

10. A computer system comprising a processor and a computer readable memory unit coupled to the processor, said computer readable memory unit containing instructions that when executed by the processor implement a method for securing sensitive data in a cloud computing environment, said method comprising:

associating, by the processor of the computer system, a hashing directive with a record of a customer system, wherein the cloud computing environment comprises a cloud and the customer system, wherein the customer system is external to the cloud, wherein the customer system comprises the computer system, wherein the computer system comprises a database storing the record, and wherein the record comprises at least one data field;

said processor obfuscating the record by hashing a respective value of each data field of said at least one data field pursuant to the associated hashing directive, wherein the hashing directive comprises a respective tag classifying said each data field as either a sensitive data field or a transactional data field, and a respective mode of hashing for each sensitive data field of the record, and wherein said obfuscating comprises removing, from the record, a first value of a first data field of the record such that the first value is not available in the record;

said processor sending the obfuscated record to the cloud, wherein the cloud is configured to process the obfuscated record and to instantiate a cloud process result field of the record with a result value calculated with values of transactional data fields of the record;

said processor receiving the processed record having the instantiated result value from the cloud; and said processor reconstituting the record by respectively reversing said obfuscating for said each sensitive data field of the record pursuant to the respective mode of hashing for each sensitive data field in the hashing directive, wherein said reconstituting comprises:

retrieving the record from the database, wherein the retrieved record comprises respective values of said at least one data field prior to said obfuscating;

reinstating the first data field of the record received from the cloud with an original value in the first data field of the retrieved record, wherein the original value is identical to the first value prior to said obfuscating; and storing, in the database, the record from said reinstating such that the record comprises the respective value for said at least one data field and the result value of the cloud process result field.

11. The computer system of claim 10, said obfuscating comprising:

selecting a first data field of the record, wherein the hashing directive indicates that the first data field is sensitive by a first tag associated with the first data field; and determining that a first mode associated with the first data field is one-way hashing.

12. The computer system of claim 10, said obfuscating comprising:

selecting a second data field of the record;

determining that a second mode associated with the second data field is two-way hashing;

creating a hash key corresponding to a second value of the second data field;

replacing the second value with the created hash key in the second data field; and storing, in the database, correlation data corresponding to the second data field, the correlation data comprising metadata used in said creating the hash key and the second value.

13. The computer system of claim 12, said reconstituting comprising:

retrieving the correlation data from the database;

calculating the second value from the hash key and the metadata of the correlation data;

replacing the hash key in the record received from the cloud with the calculated second value in the second data field of the record; and storing, in the database, the record from said replacing.

* * * * *